(12) United States Patent
Hirabayashi

(10) Patent No.: US 8,213,094 B2
(45) Date of Patent: Jul. 3, 2012

(54) LENS BARREL AND IMAGING DEVICE

(75) Inventor: Koichiro Hirabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 3 days.

(21) Appl. No.: 12/842,557

(22) Filed: Jul. 23, 2010

(65) Prior Publication Data

US 2011/0019291 A1 Jan. 27, 2011

(30) Foreign Application Priority Data

Jul. 27, 2009 (JP) ................................ 2009-174059

(51) Int. Cl.
*G02B 7/02* (2006.01)

(52) U.S. Cl. ...................................... 359/738; 359/819

(58) Field of Classification Search .......... 359/738–740, 359/819–830
See application file for complete search history.

(56) References Cited

U.S. PATENT DOCUMENTS

| | | | |
|---|---|---|---|
| 5,079,575 A * | 1/1992 | Nii et al. .......................... | 396/63 |
| 5,889,623 A * | 3/1999 | Ueda et al. .................... | 359/819 |
| 2003/0016454 A1 | 1/2003 | Yamaguchi et al. | |
| 2004/0109243 A1* | 6/2004 | Orimo et al. .................. | 359/819 |
| 2004/0210009 A1* | 10/2004 | Kobayashi et al. ........... | 525/433 |
| 2006/0018041 A1 | 1/2006 | Hirata | |
| 2006/0291076 A1 | 12/2006 | Watanabe et al. | |
| 2008/0037137 A1 | 2/2008 | Kodama et al. | |

FOREIGN PATENT DOCUMENTS

| | | |
|---|---|---|
| JP | 2530936 | 1/1997 |
| JP | 2001-004895 | 1/2001 |
| JP | 2002-014268 | 1/2002 |
| JP | 2003-270507 | 9/2003 |
| JP | 2005-227500 | 8/2005 |
| JP | 2009-116085 | 5/2009 |
| JP | 2009-282423 | 12/2009 |

OTHER PUBLICATIONS

Office Action for related U.S. Appl. No. 12/844,951 mailed Nov. 8, 2011.

* cited by examiner

*Primary Examiner* — Darryl J Collins

(74) *Attorney, Agent, or Firm* — Renner, Otto, Boisselle & Sklar, LLP

(57) ABSTRACT

The lens barrel of the present invention includes: a lens; and a light blocking member provided in the vicinity of the lens for blocking part of light traveling toward the lens, a main constituent of the light blocking member being a polymer alloy resin.

9 Claims, 6 Drawing Sheets

LENS BARREL AND IMAGING DEVICE

BACKGROUND OF THE INVENTION

1. Field of the Invention

The present invention relates to a lens barrel of an imaging device. More particularly, the present invention relates to a lens barrel which includes a light blocking member that is provided so as to cover a peripheral part of a lens for blocking unwanted light rays traveling toward the lens.

2. Description of the Related Art

Optical devices, such as still cameras, focus light rays coming into a lens barrel using lenses and photograph an image of the converged light rays using a film or imaging element. However, inside the lens barrel, there are unwanted light rays which are not necessary for photographing, for example, light rays which are reflected inside the lens barrel to reach the lenses, as well as light rays necessary for photographing. When unwanted light rays reach a film or imaging element, a photographed subject image results in a ghost or flare image. Therefore, it is necessary to block such unwanted light rays so as not to enter the lenses.

A conventional lens barrel is described with reference to FIG. 7.

FIG. 7 is a partially enlarged view of a conventional lens barrel 100. The lens barrel 100 is provided with a lens 102, which is adhesively attached to the inner wall of the lens barrel 100. Light traveling inside the lens barrel 100 toward the lens 102 includes an effective light ray 104 which is necessary for photographing and an unwanted light ray 105. A light blocking member 103 is provided so as to cover a peripheral part of the lens 102 such that the unwanted light ray 105 traveling toward the lens 102 is blocked.

Japanese Laid-Open Patent Publication No. 2009-116085 discloses the technique of blocking unwanted light rays by providing a light blocking plate over some of the components provided inside the lens barrel (for example, FIGS. 4 and 5).

In the conventional lens barrel 100 shown in FIG. 7, the light blocking member 103 is usually formed by molding of a resin which is composed of a thermoplastic resin, such as ABS (Acrylonitrile-Butadiene-Styrene resin), and carbon black added thereto. An inner rim 103a of the light blocking member 103 needs to be tapered at an acute angle in order to prevent generation of flare due to diffuse reflection of the unwanted light ray 105.

FIG. 8 is a schematic cross-sectional view of the inner rim of the conventional light blocking member 103. The light blocking member 103 is constituted of the main material 107 of a resin, such as ABS, and carbon black 108 added thereto.

As shown in FIG. 8, the inner rim 103a of the light blocking member 103 has a small thickness so that the unwanted light ray 105 can be transmitted through the inner rim 103a. As a result, the unwanted light ray 105 causes optical problems, such as flare and ghost. This means that such an optical problem still remains unsolved even though the light blocking member 103 is provided.

SUMMARY OF THE INVENTION

The present invention was conceived in order to solve the above problems. One of the objects of the present invention is to provide a lens barrel in which transmission of unwanted light rays is sufficiently smaller than in the conventional lens barrels and in which optical problems, such as flare and ghost, are less likely to occur.

A lens barrel of the present invention includes: a lens; and a light blocking member provided in the vicinity of the lens for blocking part of light traveling toward the lens, a main constituent of the light blocking member being a polymer alloy resin.

In one embodiment, the light blocking member is a product of injection molding.

In one embodiment, the polymer alloy resin contains ABS and polycarbonate.

In one embodiment, the polymer alloy resin contains carbon black as an additive.

In one embodiment, the light blocking member is positioned so as to cover a peripheral part of the lens.

In one embodiment, the polymer alloy resin contains ABS.

An imaging device of the present invention includes the above-described lens barrel.

A lens barrel of the present invention is provided with a light blocking member formed by injection molding of a resin material which is composed of a polymer alloy resin of, for example, ABS and polycarbonate, and carbon black added thereto. In the lens barrel having such a structure, transmission of unwanted light rays is small, and optical problems, such as flare and ghost, are less likely to occur.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Figure 1:
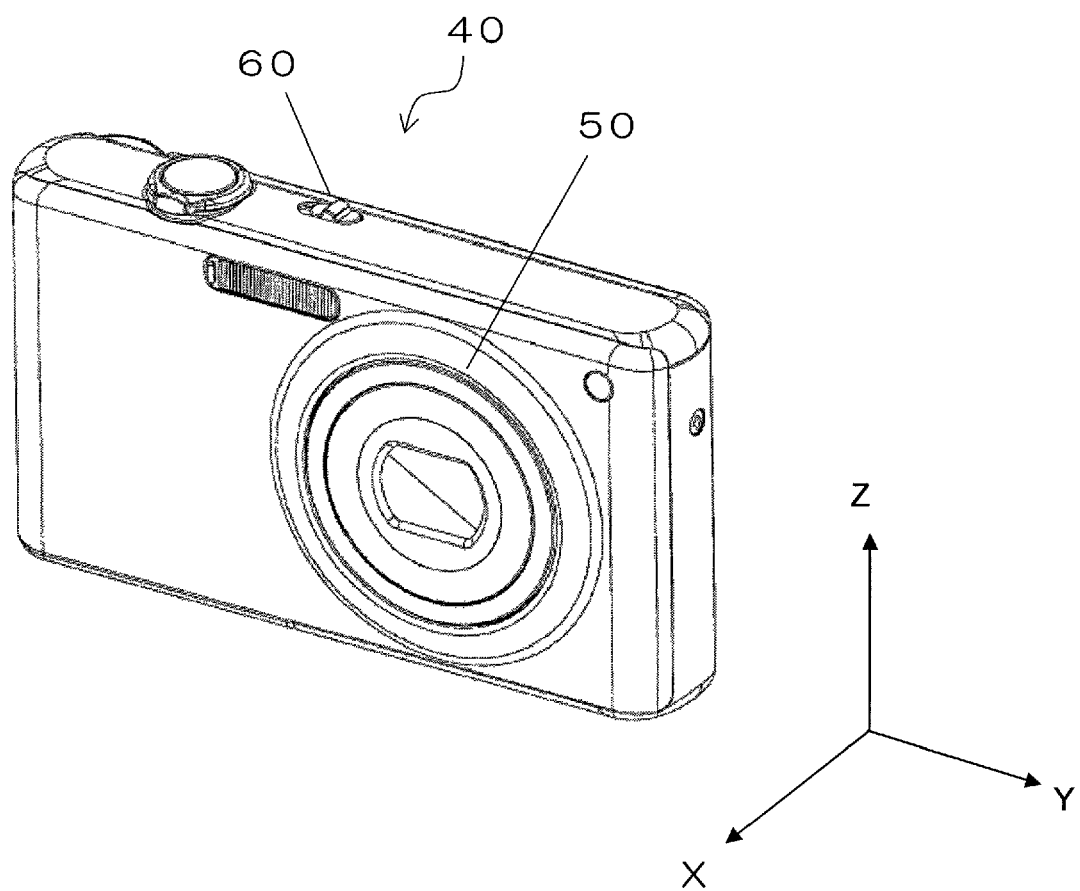
FIG. 1 shows the exterior of a digital camera 40 which includes a lens barrel 50.

FIG. 1 shows the exterior of a digital camera 40 which includes a lens barrel 50. When powered on by a power switch 60, the lens barrel 50 of the digital camera 40 is extended out, and the digital camera 40 becomes ready for shooting.

Note that the digital camera 40 shown in FIG. 1 is merely an example of an imaging device. The present invention is applicable not only to digital cameras but also to film cameras. Also, it may be a camera in which the lens barrel 50 is detachable for replacement. Also, it may not be a still camera but may be a camcorder which is capable of moving picture imaging.

Figure 2:
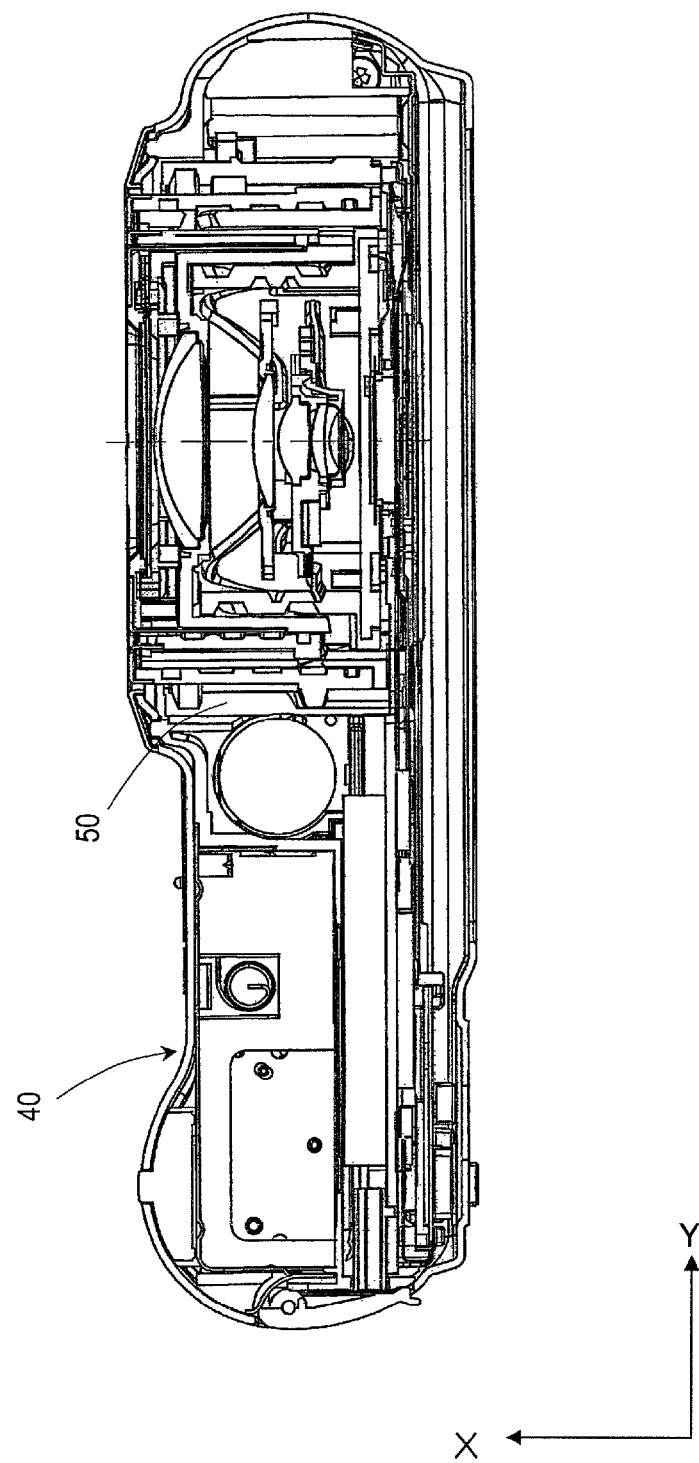
FIG. 2 is a cross-sectional view of part of the digital camera 40 which includes the lens barrel 50.

FIG. 2 is a cross-sectional view of part of the digital camera 40 which includes the lens barrel 50. FIG. 2 shows a cross section of the digital camera 40 which is seen along the Z axis of FIG. 1. The lens barrel 50 is in the retracted state when the power switch 60 is OFF, and is in the extended state when the power switch 60 is ON. In FIG. 2, the lens barrel 50 is in the retracted state.

Figure 3:
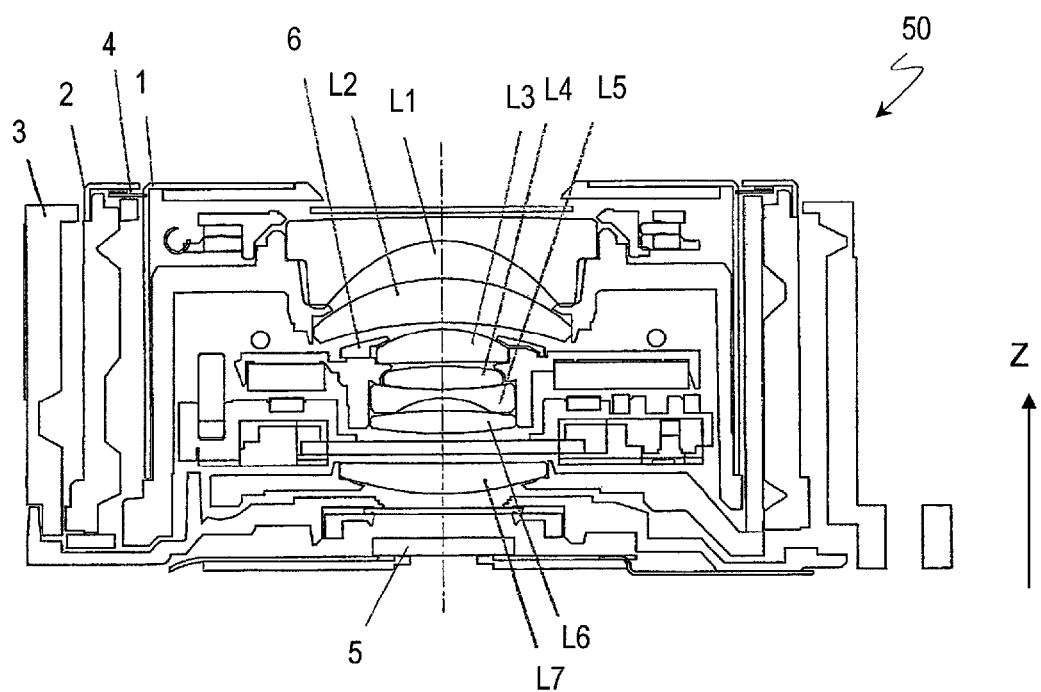
FIG. 3 is a cross-sectional view of the lens barrel 50 which is in the retracted state.
Figure 4:
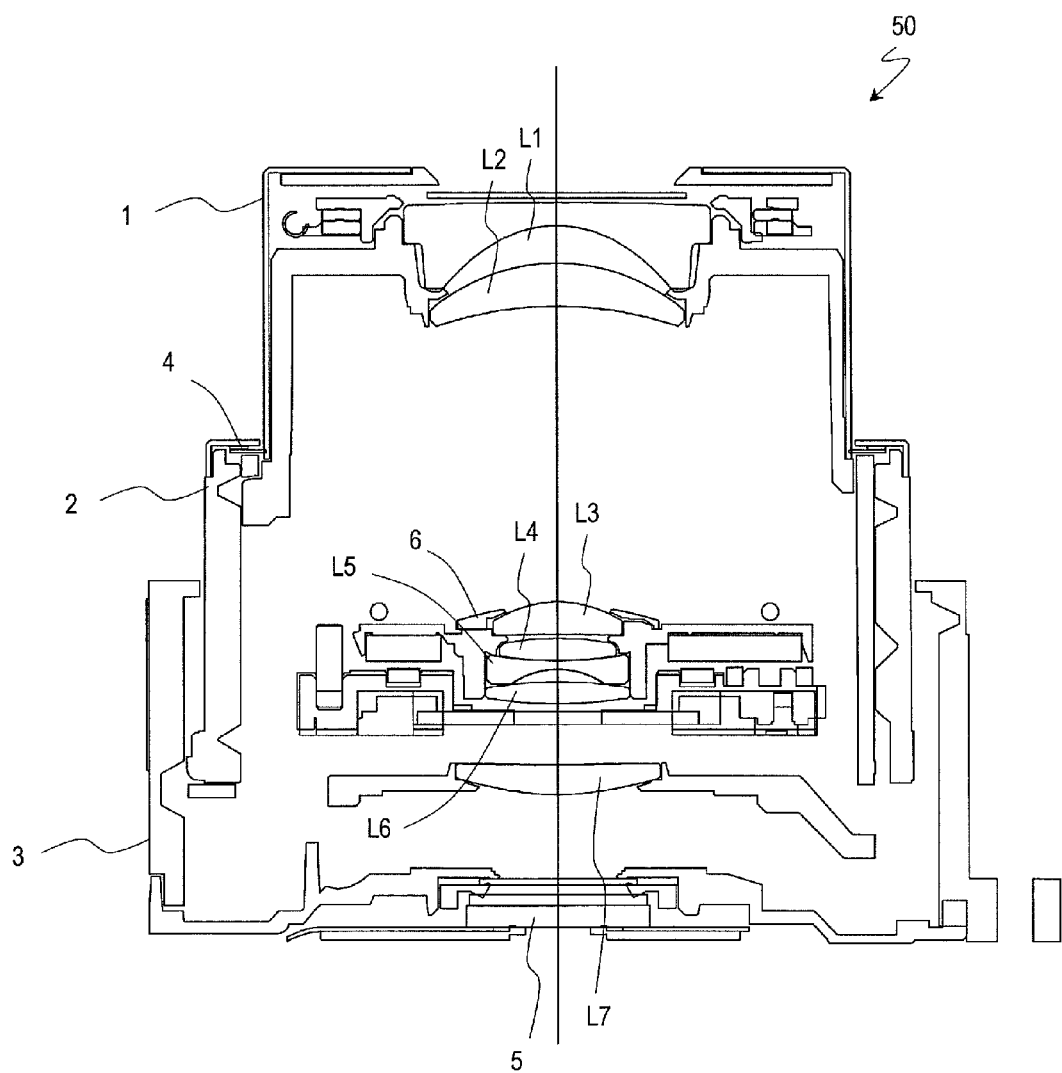
FIG. 4 is a cross-sectional view of the lens barrel 50 which is in the extended state.

FIG. 3 is a cross-sectional view of the lens barrel 50 which is in the retracted state. FIG. 4 is a cross-sectional view of the lens barrel 50 which is in the extended state. Note that, in FIG. 3 and FIG. 4, only main components of the lens barrel 50 are shown for the convenience of understanding. In actuality, the lens barrel 50 may include more components than shown.

Hereinafter, the main components of the lens barrel 50 are described with reference to FIG. 4.

The exterior of the lens barrel 50 includes a lens frame 1, a driving frame 2, and an outer frame 3.

The lens frame 1 is provided with lenses L1 and L2. The driving frame 2 moves relative to the lens frame 1. Provided between the lens frame 1 and the driving frame 2 is a light blocking ring 4. The purposes of the light blocking ring 4 are entirely blocking entry of light rays via the gap between the lens frame 1 and the driving frame 2 and blocking entry of extraneous materials (e.g., dust) via the gap between the lens frame 1 and the driving frame 2. For these purposes, the light blocking ring 4 is not provided inside the lens barrel 50 but is provided at a position between the lens frame 1 and the driving frame 2 and near an edge of the driving frame 2 from which the lens frame 1 comes out. The outer frame 3 is secured to the casing of the digital camera 40.

Inside the lens barrel 50, lenses L3 to L7 and an imaging element 5 are provided. Now, the description is focused on the lens L3.

In the present embodiment, a light blocking member 6 is provided in the vicinity of the lens L3. The light blocking member 6 extends along the perimeter of the lens L3 and covers peripheral part of the lens L3. The light blocking member 6 can prevent unwanted light rays, which would generate flare and ghost, from entering the lens L3. The reason why the light blocking member 6 is provided in the vicinity of the lens L3, which is located at a relatively deep position inside the lens barrel 50, is that the degree of flare resulting from unwanted light is larger as the unwanted light enters a lens closer to the imaging element 5.

Now, the light blocking member 6 is described in more detail with reference to the drawings FIG. 5.

Figure 5:
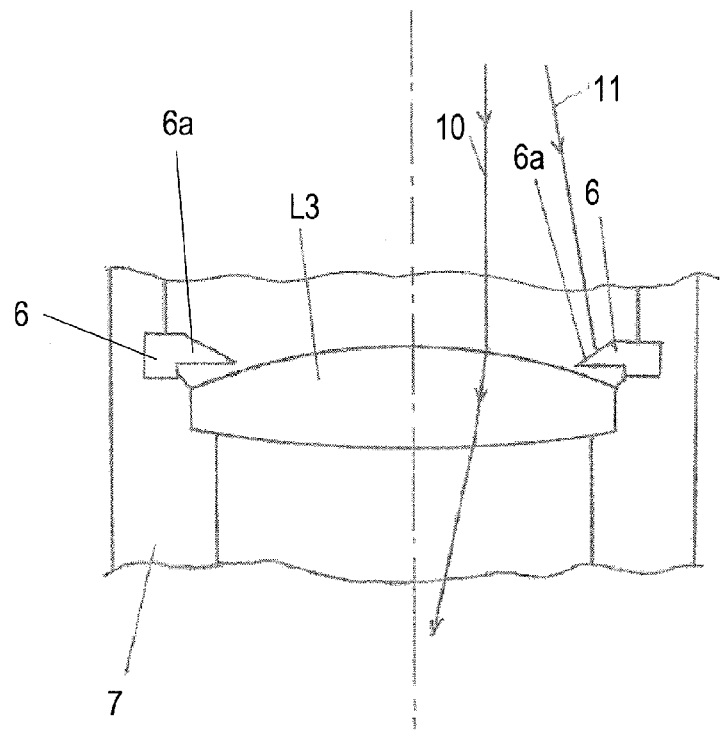
FIG. 5 is a partially enlarged view of the lens barrel 50, which illustrates the positional relationship between a lens L3 and a light blocking member 6.

FIG. 5 is a partially enlarged view of the lens barrel 50, which illustrates the positional relationship between a lens L3 and a light blocking member 6. The lens L3 is adhesively attached to a lens holding frame 7 of the lens barrel 50. The light blocking member 6 extends along the perimeter of the lens L3 and has an overhanging portion extending radially inward of the lens L3. The light blocking member 6 having such a structure blocks entry of an unwanted light ray 11 into the lens L3 via a peripheral area of the lens L3. The unwanted light ray 11 is, for example, a light ray reflected by the inner wall of the lens barrel 50 after entry into the lens barrel 50. With the light blocking member 6, only effective light rays 10 from a subject of photography enter the lens L3.

An inner rim 6a of the light blocking member 6 is tapered at an acute angle in order to prevent generation of flare due to diffuse reflection of the unwanted light rays. The present inventor found that the unwanted light rays which are transmitted through the inner rim 6a can be greatly reduced by appropriate selection of the materials of the light blocking member 6. Hereinafter, the details of the light blocking member 6 are described with reference to FIG. 6.

Figure 6:
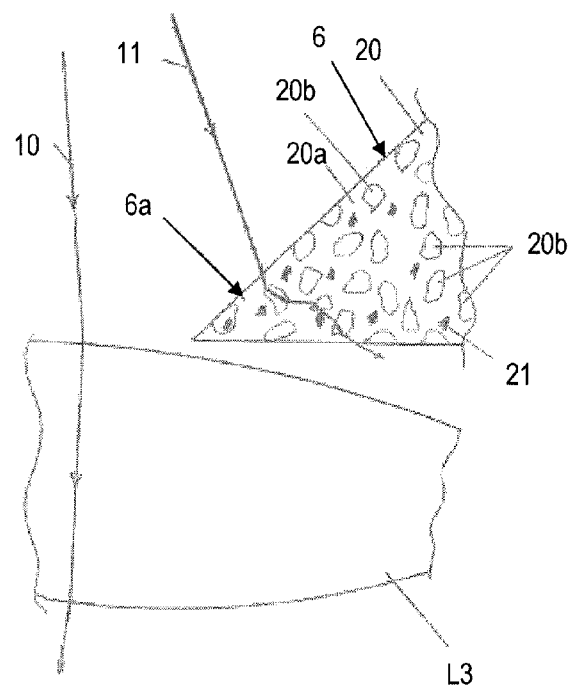
FIG. 6 is a schematic cross-sectional view of an inner rim 6a of the light blocking member 6.
Figure 7:
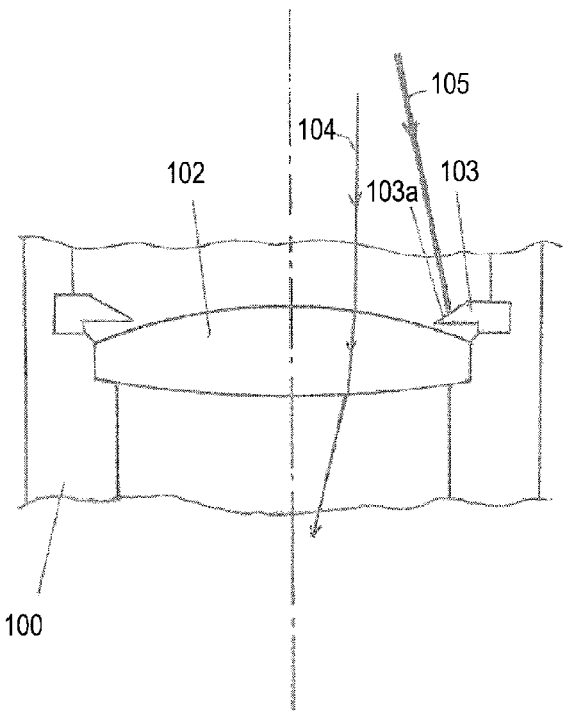
FIG. 7 is a partially enlarged view of a conventional lens barrel 100.
Figure 8:
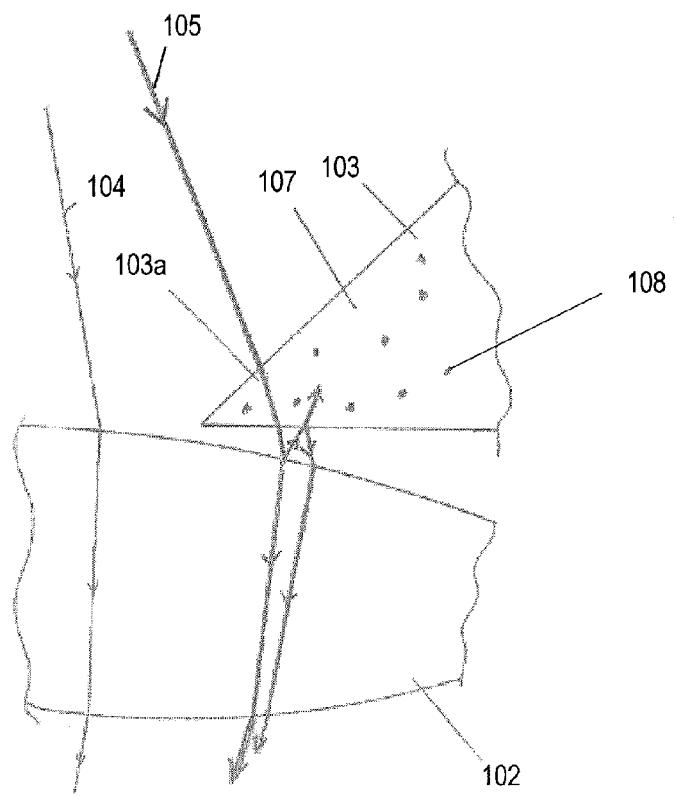
FIG. 8 is a schematic cross-sectional view of an inner rim of a conventional light blocking member 103.

FIG. 6 is a schematic cross-sectional view of the inner rim 6a of the light blocking member 6.

The light blocking member 6 of the present embodiment is a product of injection molding of a resin material which contains a polymer alloy resin 20 as the main constituent and carbon black 21 as an additive. The polymer alloy resin 20 contains, for example, ABS 20a and polycarbonate 20b. These ingredients are simply mixed, so that polycarbonate 20b in the light blocking member 6 is in the form of grains.

In general, ABS 20a has a low light transmissivity, and polycarbonate 20b has a high light transmissivity. In production of the light blocking member 6, polycarbonate 20b that has a high light transmissivity is not usually added to the material. However, the present inventor added polycarbonate 20b together with ABS 20a.

The advantage of the addition of polycarbonate 20b resides in that the refractive index of polycarbonate 20b is different from that of ABS 20a. Due to the difference in refractive index, the unwanted light ray 11 traveling across the border between ABS 20a and polycarbonate 20b undergoes refraction. FIG. 6 shows an example of the unwanted light ray 11 which undergoes refraction in the light blocking member 6. As shown, the unwanted light ray 11 cannot travel straight inside the polymer alloy resin 20 and is therefore scattered inside the polymer alloy resin 20. Thus, even when the thickness of the inner rim 6a of the light blocking member 6 is decreased, the inner rim 6a is less likely to transmit the unwanted light rays. Also, due to the carbon black 21 added to the material of the light blocking member 6, the light blocking member 6 is still less likely to transmit the unwanted light rays. Thus, a lens barrel can be realized in which transmission of unwanted light rays is reduced and in which optical problems, such as flare and ghost, are less likely to occur.

Note that the above-described polymer alloy resin that contains ABS and polycarbonate is merely an example, to which the present invention is not limited. It may be a polymer alloy resin which contains ABS and PBT (Polybutylene Terephthalate), a polymer alloy resin which contains ABS and PA (PolyAmide), or a polymer alloy resin which contains PS (PolyStyrene) and PC (polycarbonate). Preferably, at least one of the ingredients of the polymer alloy resin is in the form of grains. In any of the examples, the carbon black 21 may be added.

Note that addition of the carbon black 21 is effective for further improving the light blocking efficiency. However, even when the carbon black 21 is not added to the polymer alloy resin 20, the light blocking efficiency can be improved as compared with the conventional light blocking member.

Now, the light blocking member 6 of the present embodiment and the light blocking ring 4 (FIG. 3, FIG. 4) are described.

As described above, the light blocking member 6 and the light blocking ring 4 have the same function in terms of blocking of unwanted light rays. However, the positions they are placed, the materials, and other details are greatly different.

The light blocking member 6 of the present embodiment is provided in the vicinity of the lens L3 and is fixedly positioned relative to the lens L3. On the other hand, the light blocking ring 4 is provided between the lens frame 1 and the driving frame 2 and is not fixedly positioned relative to the lens. The position of the light blocking ring 4 relative to the lens is variable.

The light blocking member 6 is located at a relatively deep position inside the lens barrel 50 and only has the function of blocking unwanted light rays traveling toward the lens L3. The light blocking member 6 does not intend to block entry of extraneous materials, such as dust. On the other hand, the light blocking ring 4 is located at a position between the lens frame 1 and the driving frame 2 and near an edge of the driving frame 2 from which the lens frame 1 comes out. The light blocking ring 4 entirely blocks entry of light rays via the gap between the lens frame 1 and the driving frame 2. Also, the light blocking ring 4 blocks entry of extraneous materials, such as dust.

The main constituent of the light blocking member 6 is a polymer alloy resin. Also, since the light blocking member 6 is fixedly positioned relative to the lens, the problems of sliding load and generation of noise do not arise. On the other hand, to completely close the gap between the lens frame 1 and the driving frame 2, the light blocking ring 4 is pressed against the lens frame and is slightly deformed when it is in place. For such reasons, the main constituent of the light blocking ring 4 is commonly a rubber material. Since the light blocking ring 4 slides over the lens frame 1, the material of the light blocking ring 4 usually contains an additive for improving the slidability, such as fluorine or the like. Thus, the sliding load between the light blocking ring 4 and the lens frame 1 can be reduced, and generation of noise can be prevented.

A lens barrel of the present invention which includes a light blocking member is capable of greatly reducing unwanted light rays which enters a lens, so that occurrence of optical problems, such as flare and ghost, can be prevented. With such a lens barrel, an imaging device can be obtained which is capable of obtaining a high quality photographing result.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2009-174059 filed on Jul. 27, 2009 and No. 2010-165491 filed on Jul. 23, 2010, the entire contents of which are hereby incorporated by reference.

What is claimed is:

1. A lens barrel, comprising:
a lens; and
a light blocking member provided in the vicinity of the lens for blocking part of light traveling toward the lens, a main constituent of the light blocking member being a polymer alloy resin,
wherein an inner rim of the light blocking member is tapered at an acute angle, the acute angle being formed by a first edge and a second edge of the inner rim that meet at an apex of the acute angle.

2. The lens barrel of claim 1, wherein the light blocking member is a product of injection molding.

3. The lens barrel of claim 2, wherein the polymer alloy resin contains ABS and polycarbonate.

4. The lens barrel of claim 2, wherein the polymer alloy resin contains ABS.

5. The lens barrel of claim 1, wherein the polymer alloy resin contains ABS and polycarbonate.

6. The lens barrel of claim 5, wherein the polymer alloy resin contains carbon black as an additive.

7. The lens barrel of claim 1, wherein the light blocking member is positioned so as to cover a peripheral part of the lens.

8. The lens barrel of claim 1, wherein the polymer alloy resin contains ABS.

9. An imaging device, comprising the lens barrel as set forth in claim 1.

* * * * *